(12) United States Patent
Sugimoto

(10) Patent No.: US 6,995,328 B2
(45) Date of Patent: *Feb. 7, 2006

(54) HORN SWITCH GEAR AND AIRBAG SYSTEM

(75) Inventor: Shinichi Sugimoto, Hikone (JP)

(73) Assignee: Takata Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/084,249

(22) Filed: Mar. 21, 2005

(65) Prior Publication Data

US 2005/0164537 A1    Jul. 28, 2005

Related U.S. Application Data

(63) Continuation of application No. 10/798,645, filed on Mar. 12, 2004, now Pat. No. 6,881,911.

(30) Foreign Application Priority Data

Jun. 30, 2003  (JP) .............................. 2003-187870
Jan. 7, 2004   (JP) .............................. 2004-002217

(51) Int. Cl.
    *H01H 9/00* (2006.01)
(52) U.S. Cl. ................................ 200/61.54; 200/61.55
(58) Field of Classification Search ............ 200/61.54, 200/61.55, 61.56; 280/728.3, 731; 74/552
    See application file for complete search history.

(56) References Cited

U.S. PATENT DOCUMENTS

| | | | |
|---|---|---|---|
| 6,062,592 A | 5/2000 | Sakurai et al. |
| 6,139,051 A | 10/2000 | Fujita |
| 6,299,201 B1 | 10/2001 | Fujita |
| 6,457,379 B1 | 10/2002 | Mirone |
| 6,478,330 B2 | 11/2002 | Fujita |
| 6,508,485 B2 | 1/2003 | Kikuta et al. |
| 6,600,114 B2 | 7/2003 | Kikuta et al. |
| 6,616,181 B1 | 9/2003 | Ford |
| 6,675,675 B1 | 1/2004 | Sauer et al. |
| 6,688,637 B2 | 2/2004 | Igawa et al. |
| 6,719,323 B2 | 4/2004 | Kai et al. |
| 6,722,227 B2 | 4/2004 | Rabagliano et al. |

(Continued)

FOREIGN PATENT DOCUMENTS

EP    1 099 604 A2    5/2001

(Continued)

OTHER PUBLICATIONS

Patent Abstracts of Japan, vol. 2003, No. 9, Sep. 3, 2003 & JP 2003-146221 (T S Tec KK), May 21, 2003.

(Continued)

*Primary Examiner*—Michael A. Friedhofer
(74) *Attorney, Agent, or Firm*—Foley & Lardner LLP

(57) ABSTRACT

A horn switch gear includes a backward moving body, a stationary body, a biasing member, and a pair of contact members. The backward moving body, which is configured to move backward, faces the stationary body. The biasing member, which is interposed between the backward moving body and the stationary body, biases the backward moving body in a restoring direction. The contact members, which are brought into or out of contact with each other by a forward or backward movement of the backward moving body, are moved together with the backward moving body. The stationary body includes an interposition which is interposed between the contact members for separating the contact members while the backward moving body is in a restored position, and which moves away from between the contact members to bring the contact members into contact with each other while the backward moving body is in a backward position.

16 Claims, 16 Drawing Sheets

U.S. PATENT DOCUMENTS

2002/0113419 A1   8/2002   Kai et al.
2003/0151236 A1   8/2003   Xu et al.

FOREIGN PATENT DOCUMENTS

| EP | 1 153 808 A2 | 11/2001 |
| EP | 1 181 172 A | 2/2002 |
| JP | 9-30425 A | 2/1997 |
| JP | 10-100832 A | 4/1998 |
| JP | 11-278280 A | 10/1999 |
| JP | 2000-211528 A | 8/2000 |
| JP | 2001-187576 A | 7/2001 |
| JP | 2001-199300 A | 7/2001 |
| JP | 2001-213326 A | 8/2001 |
| JP | 2001-233159 A | 8/2001 |
| JP | 2001-277976 A | 10/2001 |
| JP | 2001-278060 A | 10/2001 |

OTHER PUBLICATIONS

Patent Abstracts of Japan, vol. 2003, No. 9, Sep. 3, 2003 & JP 2003-146168 (T S Tec KK), May 21, 2003.

HORN SWITCH GEAR AND AIRBAG SYSTEM

CROSS-REFERENCE TO RELATED APPLICATIONS

This application is a continuation of U.S. application Ser. No. 10/798,645, filed Mar. 12, 2004, now U.S. Pat. No. 6,881,911 which is incorporated by reference in its entirety.

BACKGROUND

The present invention relates to a horn switch and, more preferably, to a horn switch gear provided to an airbag system such that a module cover or an airbag system moves backward by pressure applied by an occupant. The present invention also relates to an airbag system including the horn switch gear.

Driver-seat airbag systems mounted on steering wheels of cars include one in which when a module cover of the airbag system is pushed, a horn switch is turned on to blow a horn. For example, Japanese Unexamined Patent Application Publication Nos. 10-100832 and 2001-114057 describe driver-seat airbag systems in which when an airbag system is pushed, a module cover moves backward to turn on a horn switch.

In known horn switch gears, one of the contact members is mounted to a module cover and the other is attached to a retainer. However, providing separate contact members increases the difficulty of assembly work which must be done with high accuracy.

Accordingly, it is an object of the present invention to provide a horn switch gear having a pair of contact members at only one of a backward moving body such as a module cover and a stationary body such as a retainer to facilitate the positioning of the contact members and an airbag system including the horn switch gear.

SUMMARY

According to an embodiment of the invention, a horn switch gear is provided. The gear includes a backward moving body configure to move backward by pressure applied by an occupant; a stationary body facing the backward moving body; a biasing member interposed between the backward moving body and the stationary body for biasing the backward moving body in a restoring direction; and a pair of contact members that are brought into or out of contact with each other by a forward or the backward movement of the backward moving body. The contact members are moved forward or backward together with the backward moving body. The stationary body includes an interposition which is interposed between the contact members for separating the contact members from each other while the backward moving body is in a restored position and which is configured to bring the contact members into contact with each other while the backward moving body is in a backward position.

In an embodiment of a horn switch gear, the stationary body may include a guide for guiding at least one of the contact members to bring the contact members into contact with each other when the backward moving body is moved backward from the restored position.

An embodiment of a horn switch gear according to the invention includes: a backward moving body configured to move backward by pressure applied by an occupant; a stationary body facing the backward moving body; n biasing member interposed between the backward moving body and the stationary body for biasing the backward moving body in the restoring direction; and a pair of contact members that are brought into or out of contact with each other by a forward or backward movement of the backward moving body. The contact members are retained by the stationary body. The backward moving body includes an interposition which is interposed between the contact members for separating the contact members from each other while the backward moving body is in a restored position and which moves away from between the contact members to bring the contact members into contact with each other while the backward moving body is in a backward position.

In an embodiment of a horn switch gear, the backward moving body may include a guide for guiding at least one of the contact members by coming into contact with it to bring the contact members into contact with each other when the backward moving body is moved backward from the restored position.

An embodiment of a horn switch gear according to the invention includes: a backward moving body configured to move backward by pressure applied by an occupant; a stationary body facing the backward moving body; a biasing member interposed between the backward moving body and the stationary body for biasing the backward moving body in a restoring direction; and a pair of contact members that are brought into or out of contact with each other by a forward or backward movement of the backward moving body. The contact members are separated from each other while the backward moving body is in a restored position. The contact members are moved forward or backward together with the backward moving body. The stationary body includes a guide for guiding at least one of the contact members by coming into contact with it to bring the contact members into contact with each other when the backward moving body is moved backward from the restored position.

An embodiment of a horn switch gear according to the invention includes: a backward moving body configured to move backward by pressure applied by an occupant; a stationary body facing the backward moving body; a biasing member interposed between the backward moving body and the stationary body for biasing the backward moving body in a restoring direction; and a pair of contact members that are brought into or out of contact with each other by a forward or backward movement of the backward moving body. The contact members are separated from each other while the backward moving body is in a restored position. The contact members are retained by the stationary body. The backward moving body includes a guide for guiding at least one of the contact members by coming into contact with it to bring the contact members into contact with each other when the backward moving body is moved backward from the restored position.

An embodiment of a horn switch gear according to the invention includes: a backward moving body configured to move backward by pressure applied by an occupant; a stationary body facing the backward moving body; a biasing member interposed between the backward moving body and the stationary body for biasing the backward moving body in a restoring direction; and a pair of contact members that is brought into or out of contact with each other by a forward or backward movement of the backward moving body. The contact members are moved forward or backward together with the backward moving body. The stationary body includes an interposition which moves away from between the contact members to bring the contact members into contact with each other while the backward moving body is in a restored position and which is interposed between the contact members for separating the contact members from each other while the backward moving body is in a backward position.

An embodiment of a horn switch gear according to the invention includes: a backward moving body configured to move backward by pressure applied by an occupant; a stationary body facing the backward moving body; a biasing member interposed between the backward moving body and the stationary body for biasing the backward moving body in a restoring direction; and a pair of contact members that are brought into or out of contact with each other by a forward or backward movement of the backward moving body. The contact members are retained by the stationary body. The backward moving body includes an interposition which moves away from between the contact members to bring the contact members into contact with each other while the backward moving body is in a restored position and which is interposed between the contact members for separating the contact members from each other while the backward moving body is in a backward position.

In an embodiment of a horn switch gear according to the invention, the backward moving body may be an airbag system, a module cover, or a module cover of an airbag system.

In an embodiment of a horn switch gear, while the backward moving body (which may be, for example, a module cover or an airbag system) is in a restored position (i.e., in an unpushed condition), the contact members may be separated from each other. When the backward moving body is pushed, the interposition may move away from between the contact members to bring the contact members into contact with each other, thereby blowing a horn.

In an embodiment of a horn switch gear, it is also possible to include a guide for guiding at least one of the contact members which comes into contact with it to bring the contact members into contact with each other when the backward moving body is moved backward from the restored position. With such a structure, the contact members may be forced by the guide to come into contact with each other, increasing the contact pressure of the contact members.

In an embodiment of a horn switch gear, when the backward moving body moves backward, the contact members may be guided by a guide to come into contact with each other to blow the horn.

In an embodiment of a horn switch gear, while the backward moving body (which may be, for example, a module cover or an airbag) is in a restored position, the contact members may be in contact with each other. A horn control circuit may be constructed not to bring the horn into conduction with the contact members in a closed condition.

In an embodiment of a horn switch gear, when the backward moving body moves backward, the interposition may enter the contact members to separate them from each other, i.e., to open the contact members. A horn control circuit may bring the horn into conduction to blow the horn.

In an embodiment of a horn switch gear, the horn switch gear may have contact members at only one of the backward moving body and the stationary body. As a result, the positioning of the contact members may be easy, making it easy to assemble the airbag system and so on.

An embodiment of a horn switch gear according to the present invention includes: a moving body configured to move backward by pressure applied by an occupant; a stationary body facing the backward moving body; a biasing member interposed between the moving body and the stationary body; a pair of contact members that are configured to be brought into or out of contact with each other by a forward or backward movement of the moving body; and an interposition which: is interposed between the contact members when the moving member is in a first position, and is not interposed between the contact members when the moving member is in a second position. The contact members either are retained by the stationary body or are moved together with the moving body.

In an embodiment of a horn switch according to the present invention, the first position may a restored position and the second position is a backward position. Similarly, the first position may be a backward position and the second position may be a restored position.

In an embodiment of a horn switch according to the present invention, the interposition may be part of the stationary body or part of the moving body.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 2A and 2B are sectional views the horn switch gear of FIG. 1 in which FIG. 2A is a non-contact (i.e., a restored position) view and FIG. 2B is an in-contact (i.e., a backward position) view;

DETAILED DESCRIPTION

Figure 1:
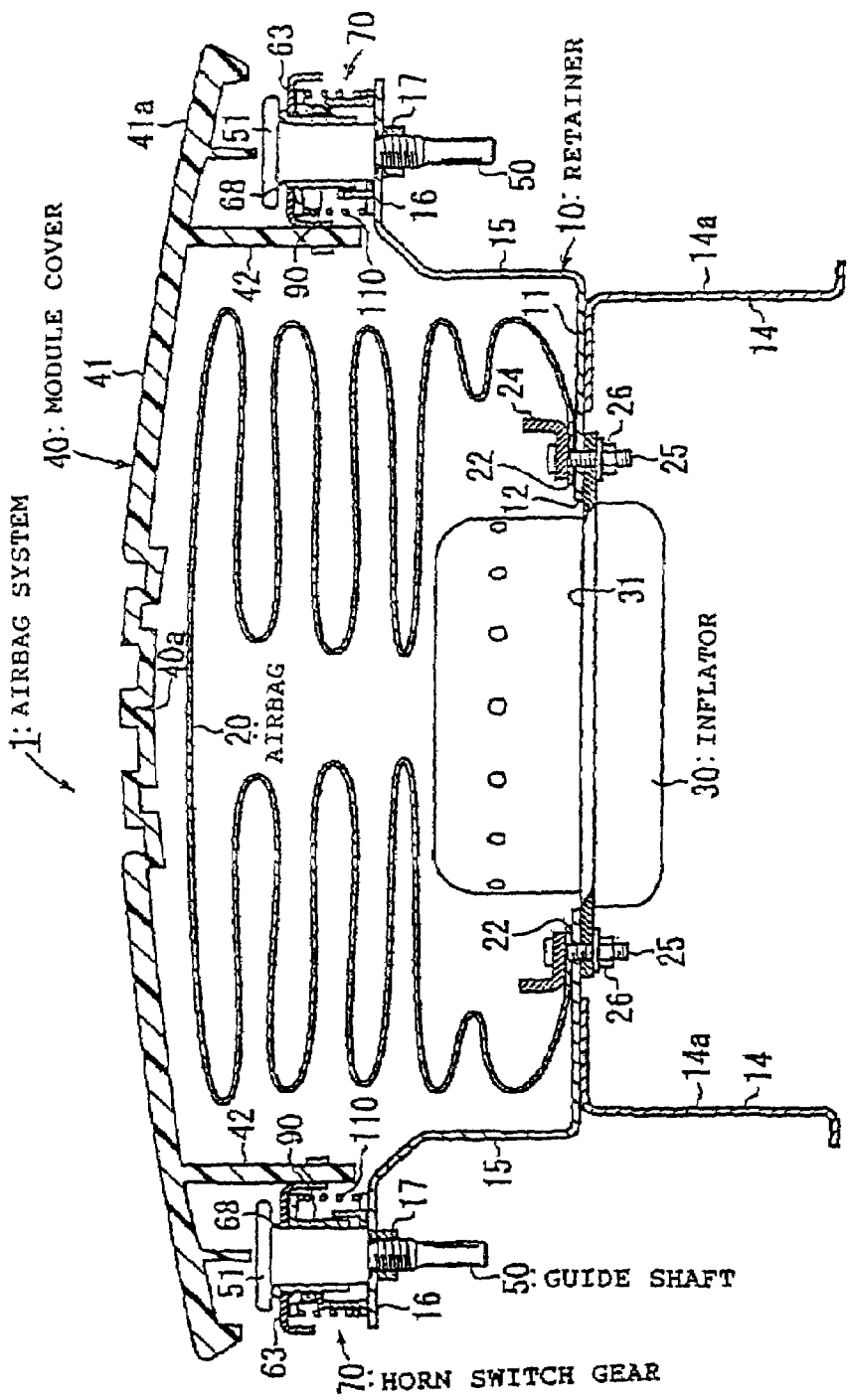
FIG. 1 is a sectional view of an embodiment of an airbag system including an embodiment of a horn switch gear according to the present invention.
Figures 2A, 2B:
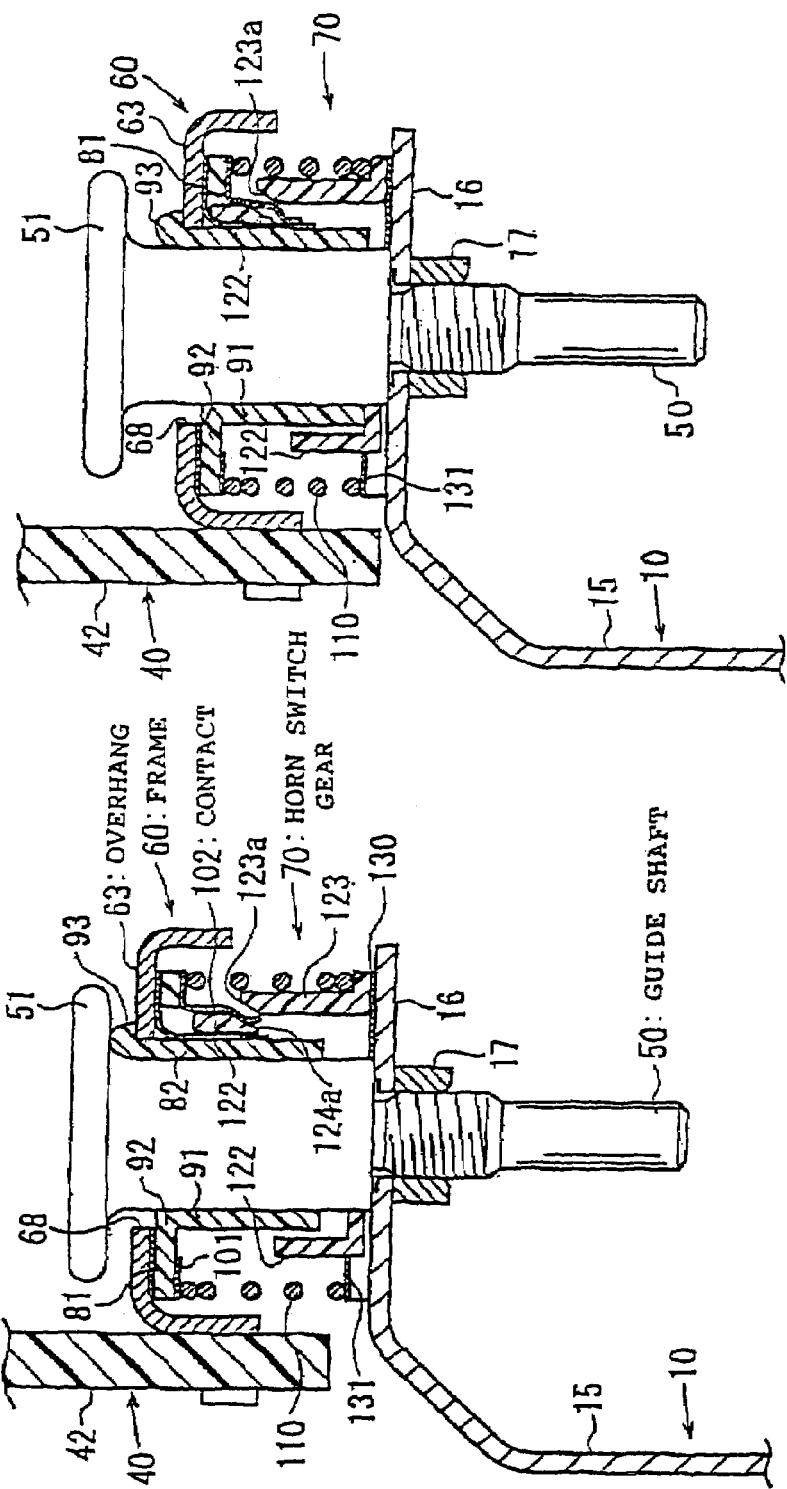
Figure 3:
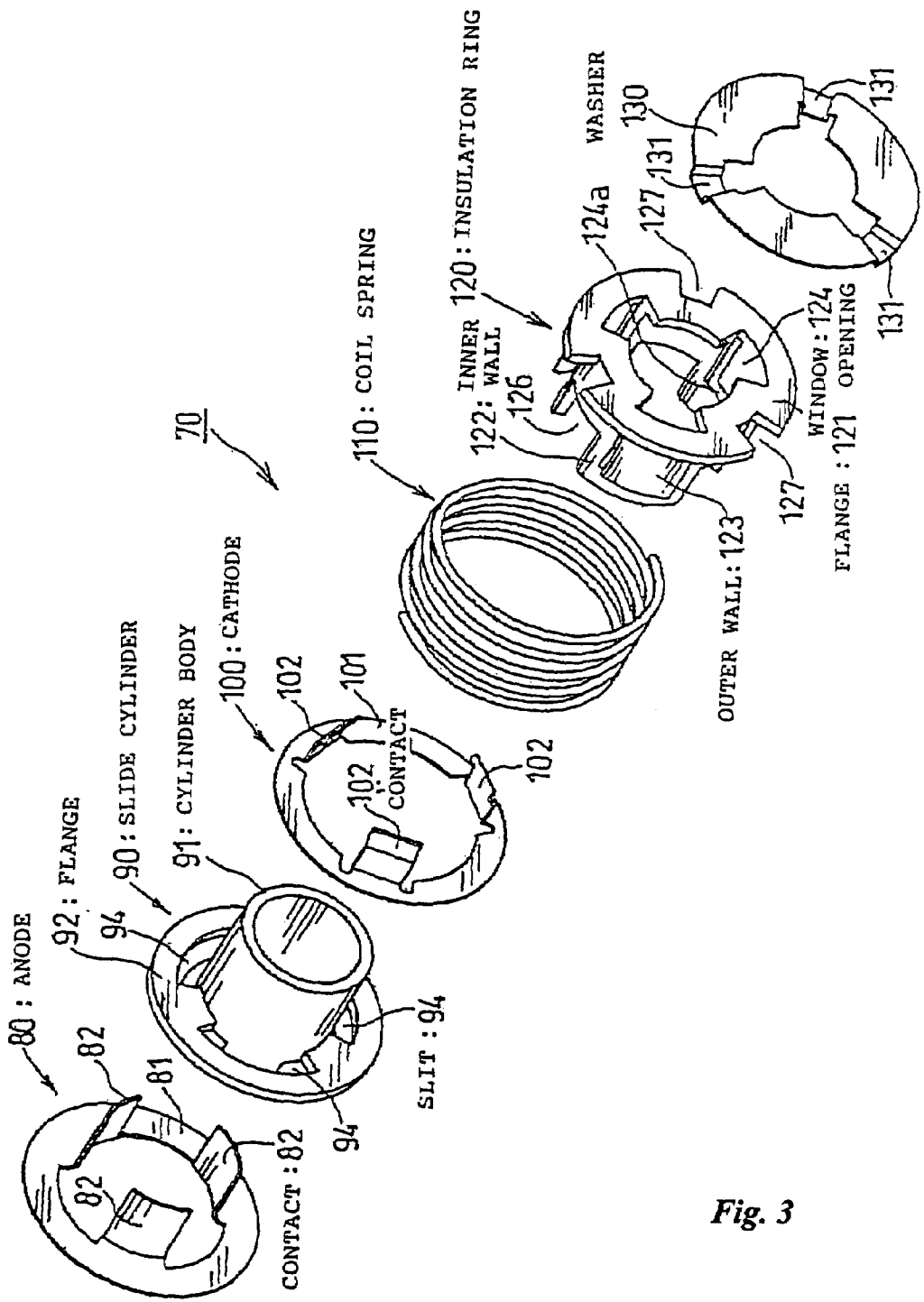
FIG. 3 is an exploded perspective view of the horn switch gear of FIG. 1.
Figure 4:
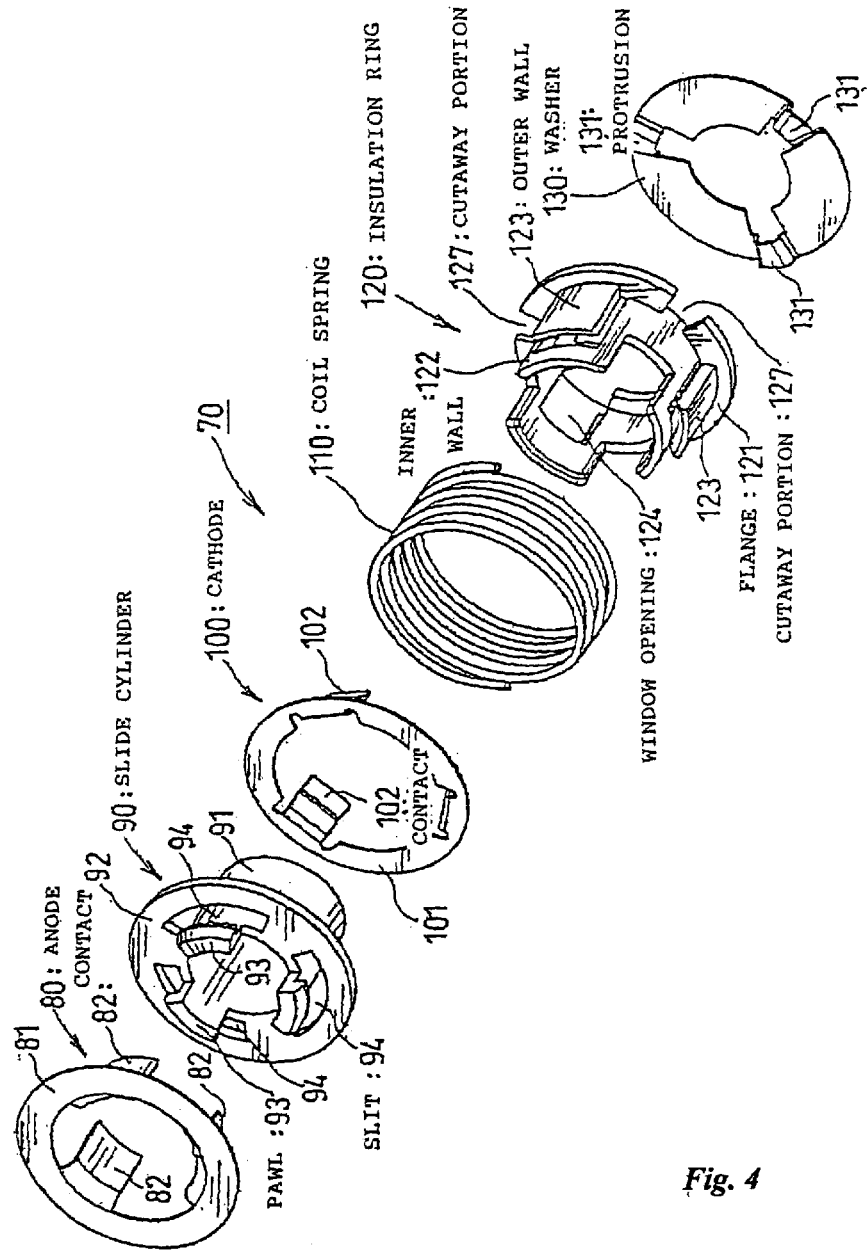
FIG. 4 is an exploded perspective view of the horn switch gear of FIG. 1.
Figure 5:
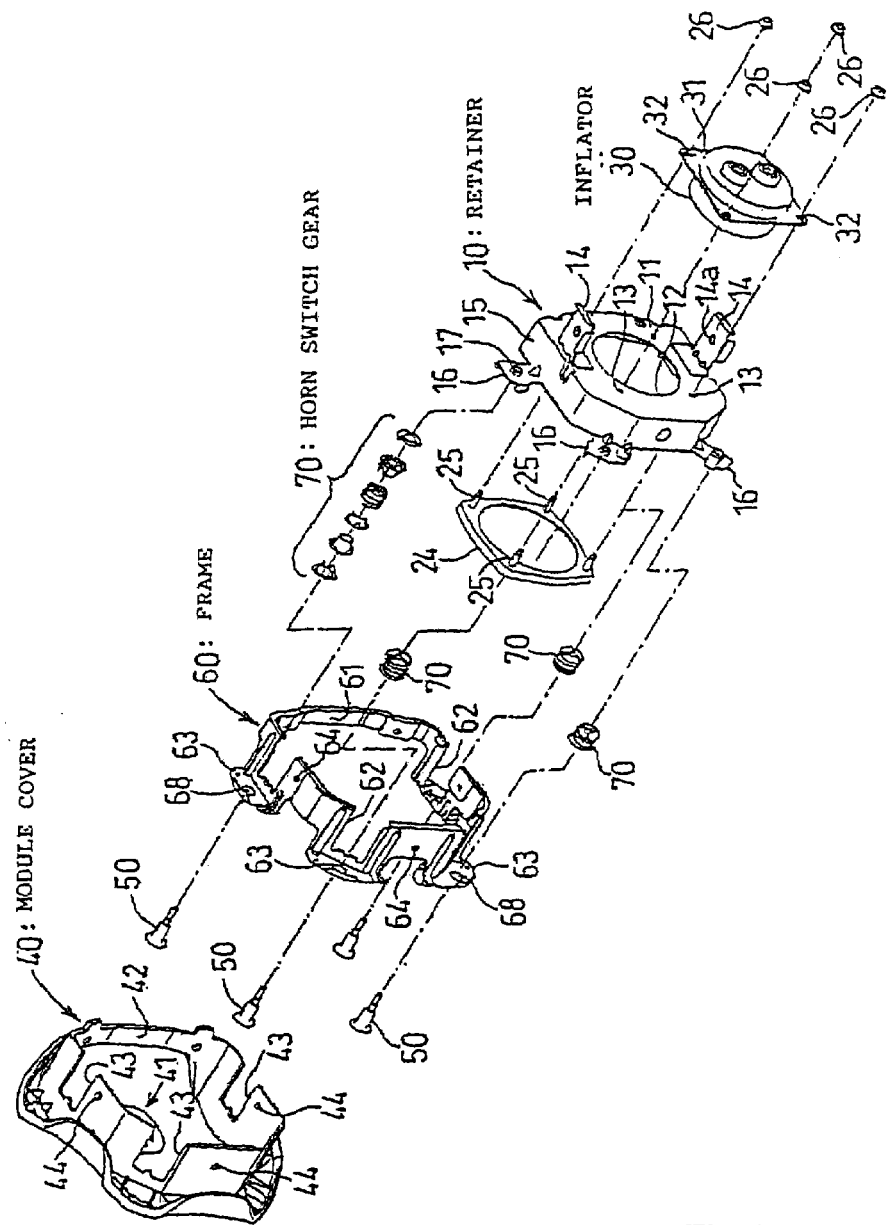
FIG. 5 is an exploded perspective view of the airbag system of FIG. 1.

Embodiments of the present invention will be described hereinafter with reference to the drawings. FIG. 1 shows an airbag system 1 having a horn switch gear 70 according to an embodiment of the invention in sectional view. FIGS. 2A and 2B show the horn switch section of FIG. 1 in enlarged view. FIGS. 3 and 4 shows the horn switch gear 70 in exploded view, viewed from opposite directions from each other. And, FIG. 5 shows the airbag system 1 in exploded perspective view. FIG. 2A shows an "unpushed" state in which a module cover 40 is not pushed. FIG. 2B shows a "module-cover pushed state" in which the module cover 40 is pushed to blow a horn.

The airbag system 1 is a driver-seat airbag system mounted in the center of a steering wheel. The airbag system 1 includes a metal retainer 10, an airbag 20 mounted to the retainer 10 with an airbag-mounting ring 24, an inflator 30 for inflating the airbag 20, a synthetic-resin module cover 40 which covers the folded airbag 20, and a horn switch gear 70.

The module cover 40 has a grooved tear line 40a. The module cover 40 is torn open along the tear line 40a when the airbag 20 is inflated by the inflator 30. The airbag 20 is not shown in FIG. 5.

As clearly shown in FIGS. 1 and 5, the retainer 10 includes a substantially rectangular main plate 11. The main plate 11 has an opening 12 for the inflator 30 to be inserted. Around the opening 12 is provided an insertion hole 13 for a stud bolt 25 rising from the airbag-mounting ring 24.

An anchor piece 14 rises from the outer periphery of the main plate 11 of the retainer 10 toward the lower part in the drawing (opposite to an occupant). The anchor piece 14 is for mounting the airbag system 1 to a steering wheel. The anchor piece 14 has an opening 14a for a bolt or the like to be inserted. The opening 14a may be a bolting screw hole.

A peripheral wall 15 rises from substantially the whole outer circumference of the main plate 11 (except the part of the anchor piece 14) upward in the drawing (toward the occupant). Extensions 16 extend sideward (laterally from the airbag system 1) from the rising end of the peripheral wall 15.

To each extension 16, a metal nut 17 into which a metal guide shaft 50 is screwed is firmly fixed by welding, caulking, or integral molding.

The periphery of an inflator insertion hole 22 of the airbag 20 is superposed on the periphery of the inflator opening 12 of the retainer main plate 11, on which the airbag-mounting ring 24 is superposed. A stud bolt 25 is inserted into a bolt insertion hole formed around the periphery of the inflator insertion hole 22 of the airbag 20. The stud bolt 25 is inserted into the bolt insertion hole 13 of the retainer 10. The stud bolt 25 is further inserted into a bolt insertion hole 32 of a flange 31 of the inflator 30 and tightened with a nut 26 (FIG. 1). Thus, the airbag 20 and the inflator 30 are fixed to the retainer 10.

The module cover 40 includes a main surface 41 facing the occupant and a leg piece 42 rising from the back of the main surface 41. The leg piece 42 is integrated with the main surface 41 by synthetic-resin injection molding into a nearly rectangular frame shape similar to the peripheral wall 15 of the retainer 10. The peripheral side 41a of the main surface 41 extends outward from the leg piece 42.

The nearly rectangular-frame-shaped leg piece 42 has cutaway portions 43 cut from the rising end of the leg piece 42. The cutaway portions 43 are constructed to receive the extensions 16 of the retainer 10. The leg piece 42 also has rivet holes 44.

The leg piece 42 has a metal frame 60 mounted thereto. The frame 60 includes a frame body 61 surrounding the outer surface of the leg piece 42 and overhangs 63 extending laterally from the frame body 61.

The frame body 61 has rivet holes 64 (FIG. 5). The rivet holes 64 and the leg piece 42 are interposed on each other, which are riveted (not shown) through the rivet holes 44 and 64, and so the frame 60 is fixed to the leg piece 42.

The frame body 61 has cutaway portions 62 having a size and an arrangement corresponding to the rim of the cutaway portions 43 of the leg piece 42. The cutaway portions 43 and 62 receive the extensions 16 of the retainer 10.

Each overhang 63 has an insertion hole 68 for the guide shaft 50.

Referring to FIG. 2, the lower end of the guide shaft 50 is screwed into the nut 17 of each extension 16 to be fixed to the extension 16, rising from the extension 16 toward the occupant. The guide shaft 50 has a flange 51 serving as a stopper at the upper rim. The horn switch gear 70 is provided so as to be fitted on the guide shaft 50.

The structure of the horn switch gear 70 will be described mainly with reference to FIGS. 2 to 4.

The horn switch gear 70 includes an anode 80, a slide cylinder 90, a cathode 100, a coil spring 110, an insulation ring 120, and a washer 130, as shown in FIGS. 3 and 4.

The anode 80 includes a washer-shaped ring flange 81 and a plurality of (three in this embodiment) tongue-shaped contacts 82 rising from the inner periphery of the flange 81 in the same directions.

The slide cylinder 90 includes a tubular cylinder body 91, a flange 92 extending from one end of the cylinder body 91 along the axial center, and pawls 93 (FIG. 4) extending from the end of the cylinder body 91 in parallel to the axial center. The flange 92 has three arc-shaped slits 94 extending along the outer periphery of the cylinder body 91 around the inner periphery thereof.

The cathode 100 includes a flange 101 and three tongue-shaped contacts circumferentially rising from the inner periphery of the flange 101. As shown in FIG. 2, the lower end of each contact 102 is curved toward the center of the cathode 100.

The insulation ring 120 includes a flange 121, a nearly cylindrical inner wall 122 rising from the flange 121, and three outer walls 123 rising along the outer periphery of the inner wall 122. The part of the inner wall 122 facing the outer walls 123 has windows (also referred to as "window openings") 124. Each window 124 extends from the inner periphery of the flange 121 toward the rising end of the inner wall 122. The upper rim of the windows 124 is located slightly lower than the upper end of the outer wall 123 (adjacent to the flange 121).

As shown in FIG. 2, the upper rim of the windows 124 forms an inclined surface 124a that is closer to the outer wall 123 at the upper part. The upper end of the outer wall 123 forms an inclined surface 123a that is closer to the inner wall 122 at the lower part. The inclined surface 123a serves as guide for guiding the contact 102 to bring it into contact with the contact 82.

Each contact 102 of the cathode 100 is slidably superposed on the outer circumference of the inner wall 122. When the module cover 40 is in restored (i.e., in an unpushed, non-contact condition), the lower end of the contact 102 is in contact with the inner-wall inclined surface 124a (FIG. 2A). When the module cover 40 is pushed into a backward position, the lower end of the contact 102 is separated from the inclined surface 124a but is brought into contact with the inclined surface 123a at the upper end of the outer wall 123 and the contact 82 of the anode 80 (FIG. 2B). The outer circumference of the inner wall 122 and the inner circumference of the outer wall 123 are in an approximately equal radius relative to the central axis of the insulation ring 120.

The inner wall 122 has cutaway portions 126 at three locations of the upper end thereof. The flange 121 of the insulation ring 120 has cutaway portions 127 at three locations of the outer periphery thereof.

The washer 130 has three protrusions 131 to be cut in the cutaway portions 127. The protrusions 131 have a rising height larger than the thickness of the flange 121, projecting upward from the upper surface of the flange 121 with the horn switch gear 70 in an assembled condition (FIG. 2).

The coil spring 110 has a diameter so as to be fitted on the outer wall 123 and brought into contact with the flange 121 and the flange 101 of the cathode 100.

As shown in FIG. 2, each contact 82 of the anode 80 is inserted into the slit 94 of the slide cylinder 90 and superposed on the outer circumference of the cylinder body 91. The flange 81 of the anode 80 is superposed on the flange 92 of the slide cylinder 90, which are fixed together with an adhesive or the like as necessary.

The flange 101 of the cathode 100 is superposed on the flange 92, which are fixed together with an adhesive or the like as necessary. The cathode 100 and the slide cylinder 90 may be fixed together by engagement or the like.

The coil spring 110 is fitted on the outer circumference of the outer walls 123 of the insulation ring 120. The insulation ring 120 is coaxially arranged around the outer circumference of the cylinder body 91 such that the inner wall 122 is inserted between the contacts 82 and 102. The pawls 93 of the slide cylinder 90 are inserted and locked into the guide-shaft insertion hole 68 of the frame 60.

The flange 121 located at the lower end of the horn switch gear 70 is superposed on the extension 16 through the washer 130. The lower end of the coil spring 110 is in contact with the protrusions 131 of the washer 130, while the upper end of the coil spring 110 is in contact with the flange 101 of the cathode 100. Thus, the cathode 100 is brought into conduction with the retainer 10 through the coil spring 110 and the washer 130. Since the retainer 10 is mounted to a steering wheel (not shown), the cathode 100 is brought into conduction with the cathode of a battery of a vehicle. The anode 80 is in close contact with the overhangs 63 to be brought into contact with the anode of the battery through a lead wire (not shown) connecting to the overhangs 63.

In the airbag system 1 including the horn switch gear 70 with such a structure, the upper part of each window 124 of the insulation ring 120 interposes between the contacts 82 and 102, thus separating the contacts 82 and 102 from each other (FIG. 2A) until the module cover 40 is pushed. Thus, the upper part of the windows 124 of the inner wall 122 serves as interposition (i.e., a separating element) for separating the contacts 82 and 102 from each other.

The module cover 40 is pushed upward toward a restored position (FIG. 2A) by the coil spring 110. The pawls 93 are brought into contact with the flange 51 of the guide shaft 50 by the pressure of the coil spring 110.

Referring to FIG. 2B, when the module cover 40 is pushed by an occupant, the frame 60 integrated with the module cover 40 moves back downward to contract the coil spring 110 by pressure, thereby moving the slide cylinder 90, the anode 80, and the cathode 100 downward. Accordingly, the contacts 82 and 102 also move downward together therewith, the contacts 102 being pushed inward by the inclined surfaces 123a, so that the contacts 82 and 102 are brought into contact with each other to blow the horn.

When the occupant releases the pressure applied to the module cover 40, the module cover 40 is moved back into the restored position of FIG. 2A by the repulsive force of the coil spring 110, thereby stopping the horn.

As previously described, both of the anode 80 and the cathode 100 of the horn switch gear 70 are arranged to the module cover 40, improving the positioning accuracy of the anode 80 and the cathode 100 when assembled to the module cover 40.

Figures 6A, 6B:
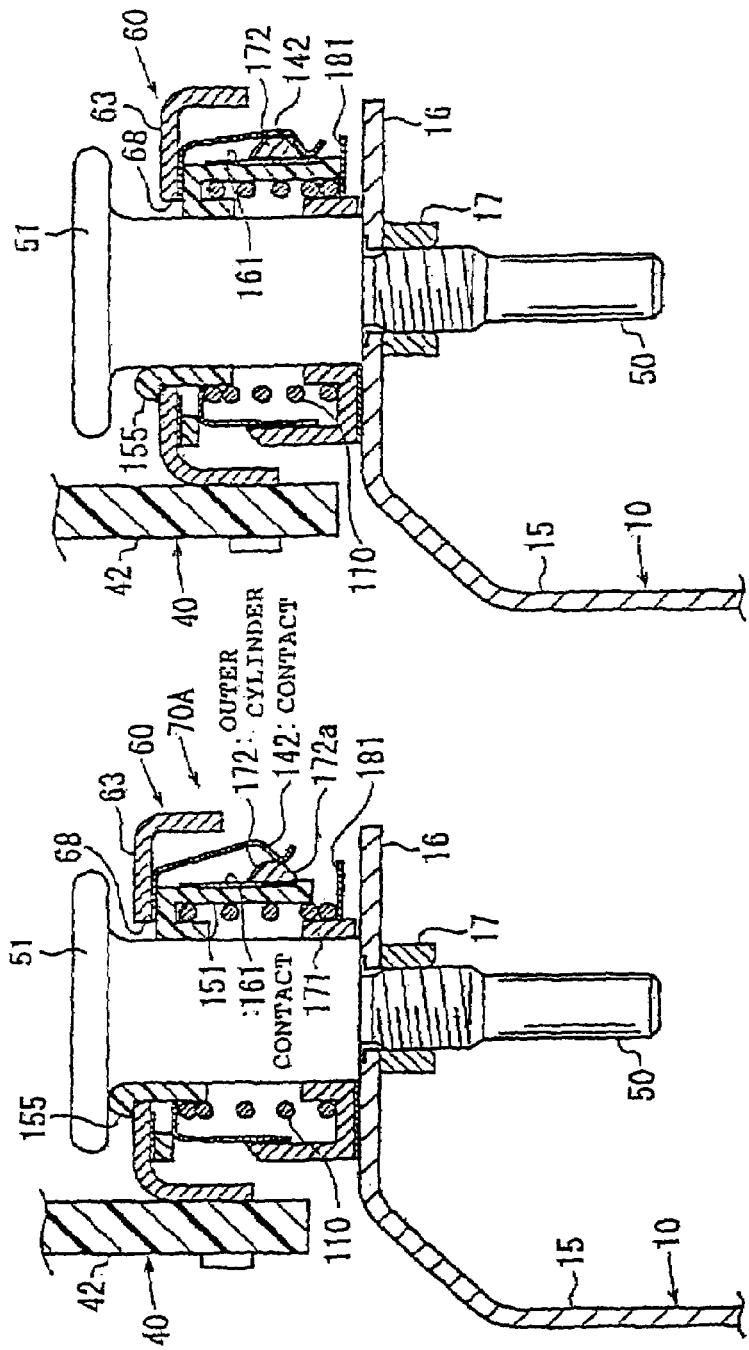
FIGS. 6A and 6B are sectional views of a second embodiment of a horn switch gear according to the present invention.
Figure 7:
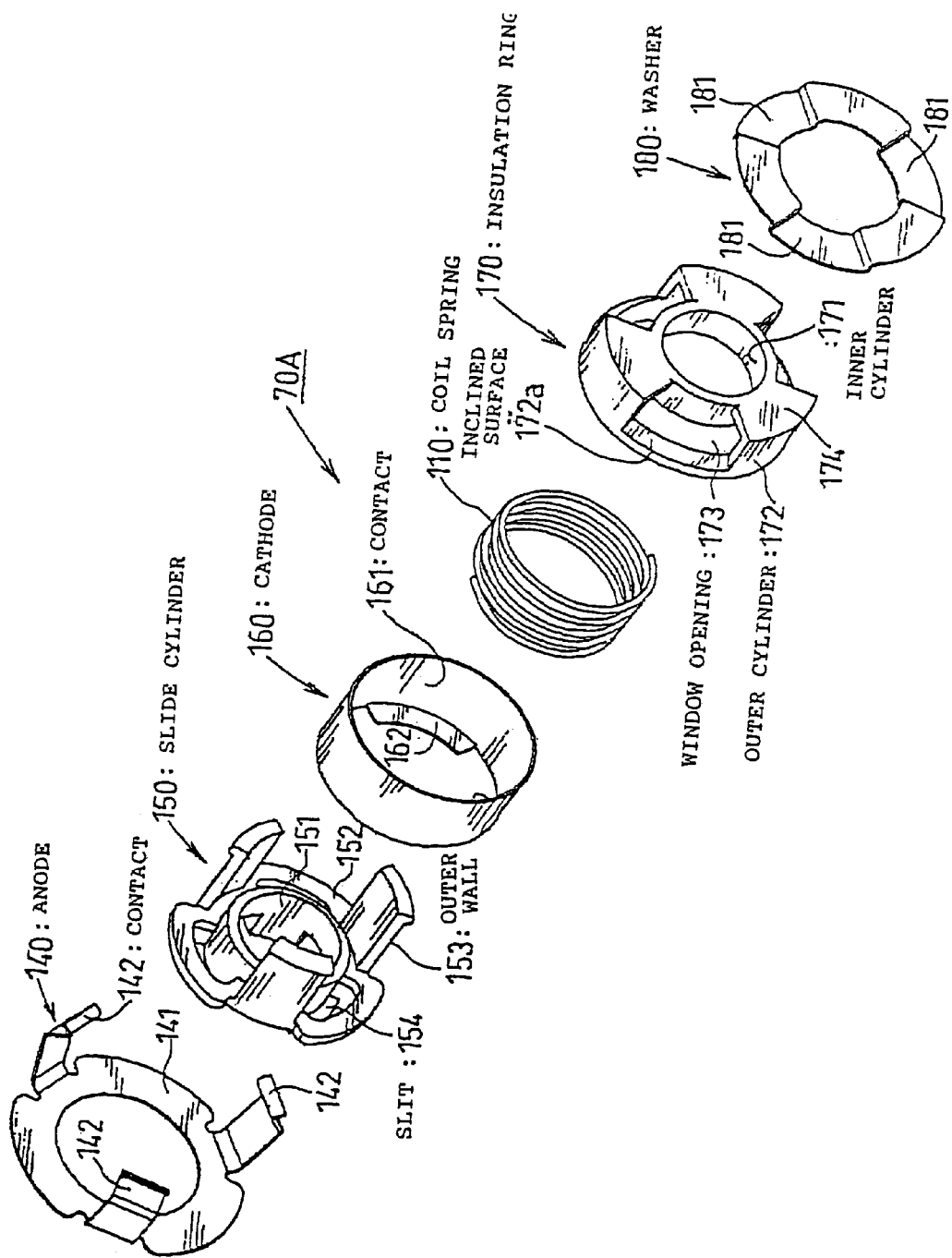
FIG. 7 is an exploded perspective view of the horn switch gear of FIGS. 6A and 6B.
Figure 8:
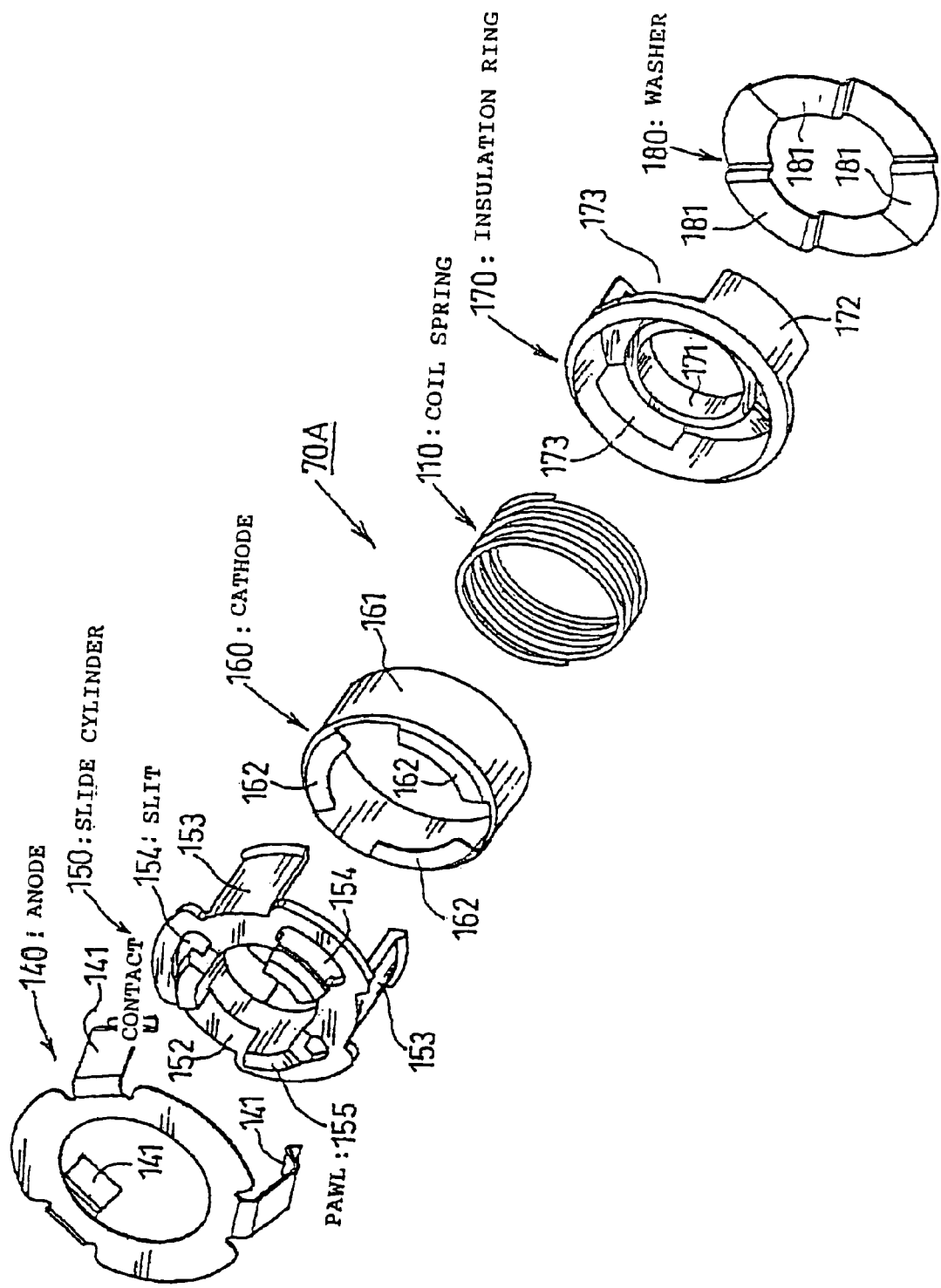
FIG. 8 is an exploded perspective view of the horn switch gear of FIGS. 6A and 6B.

Referring to FIGS. 6 to 8, a horn switch gear 70A according to a second embodiment will be described.

In this embodiment, an anode 140 includes a flange 141 and three contacts 142 rising from the outer periphery of the flange 141.

A slide cylinder 150 has an inner wall 151 and outer walls 153 rising from the inner and the outer peripheries of a flange 152, respectively. The flange 152 has slits 154 for the contacts 142 to pass through. From the inner periphery of the flange 152, pawls 155 project in the direction opposite to the inner wall 151.

A cathode 160 has a cylindrical contact 161 and a collar 162 projecting inwardly from the upper periphery of the cylindrical contact 161.

An insulation ring 170 has an inner cylinder 171, an outer cylinder 172, a bottom 174 connecting them together, windows (also referred to as "window openings") 173 shaped to cut the intersection between the bottom 174 and the outer cylinder 172, and inclined surfaces 172a formed at the upper rims of the windows 173. The inclined surfaces 172a are each tapered so as to be reduced in diameter at the lower part.

The upper parts of the windows 173 of the outer cylinder 172 serve as interposition (i.e., a separating element) for separating the contacts 142 and 161 from each other.

A washer 180 has protrusions 181 which come into the windows 173 for supporting the lower end of the coil spring 110.

The contact 161 of the cathode 160 is superposed on the outer surface of the inner wall 151 of the slide cylinder 150, as shown in FIG. 6, and the collar 162 is brought into contact with the upper end of the coil spring 110. Thus, the contact 161 of the cathode 160 is brought into conduction with the vehicle body through the coil spring 110 and the washer 180. The collar 162 overlaps with the flange 152 of the slide cylinder 150.

The lower part of the contact 161 is arranged between the outer cylinder 172 of the insulation ring 170 and the inner wall 151 of the slide cylinder 150. The contacts 142 of the anode 140 are arranged outside the outer cylinder 172.

The other arrangement in FIGS. 6 to 8 is similar to that of the first embodiment.

As shown in FIG. 6A, the outer cylinder 172 is interposed between the contacts 142 and 161, thereby separating the contacts 142 and 161 from each other when the module cover 40 is in unpushed (i.e., restored) position.

When the module cover 40 is pushed by an occupant, the anode 140 and the cathode 160 are pushed down together with the slide cylinder 150, thereby letting the contacts 142 of the anode 140 move into the windows 173 under the force of an inward elasticity of the contacts 142. When the anode contacts 142 enter the windows 173, they come into contact with the contact 161 of the cathode 160 (FIG. 6B), thereby blowing the horn. When the occupant releases the pressure applied to the module cover 40, the module cover 40 is pushed back to the restored position of FIG. 6A by the coil spring 110. At that time, the upper parts of the windows 173 of the outer cylinder 172 enter the contacts 142 and 161 and separate them from each other, thereby stopping the horn.

Figures 9A, 9B:
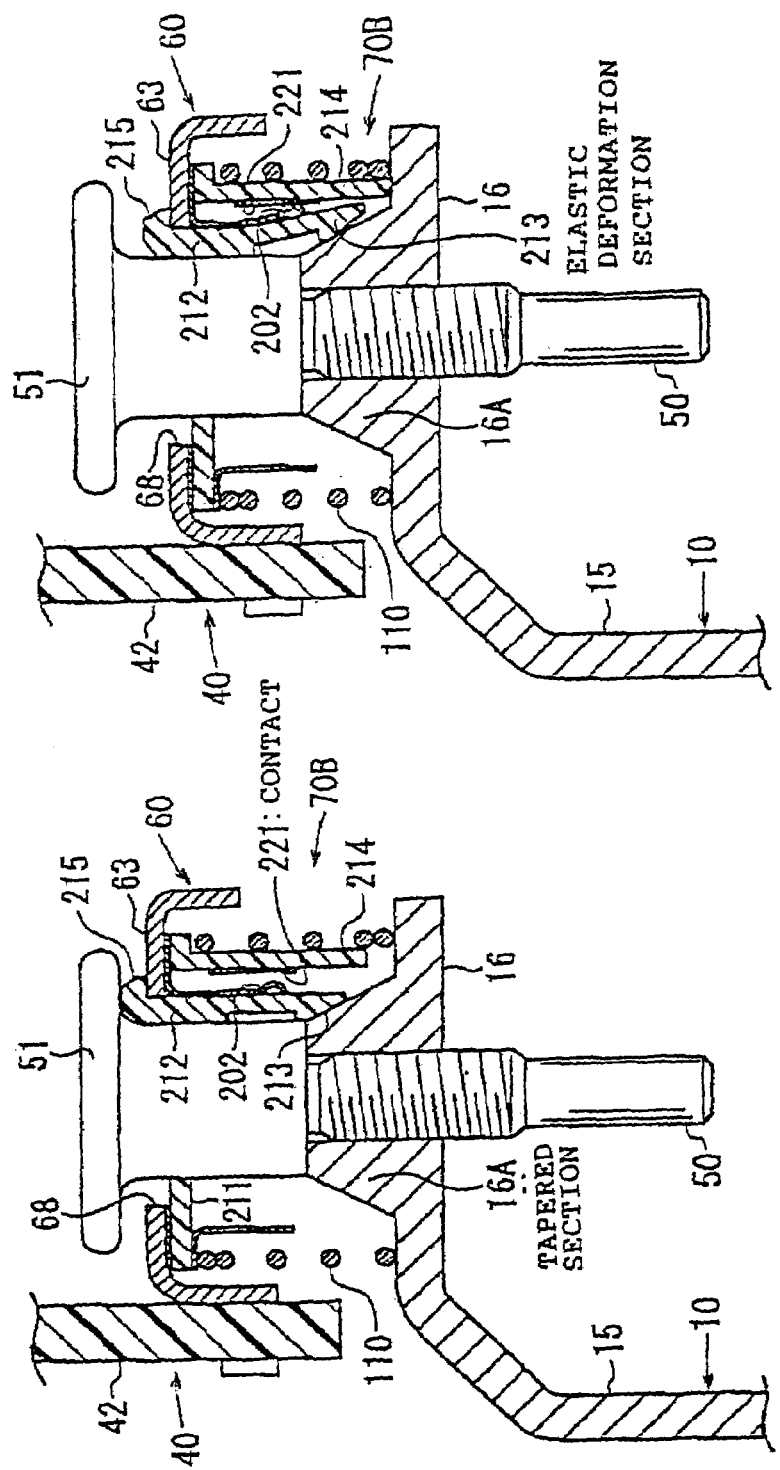
FIGS. 9A and 9B are sectional views of a third embodiment of a horn switch gear according to the present invention.
Figure 10:
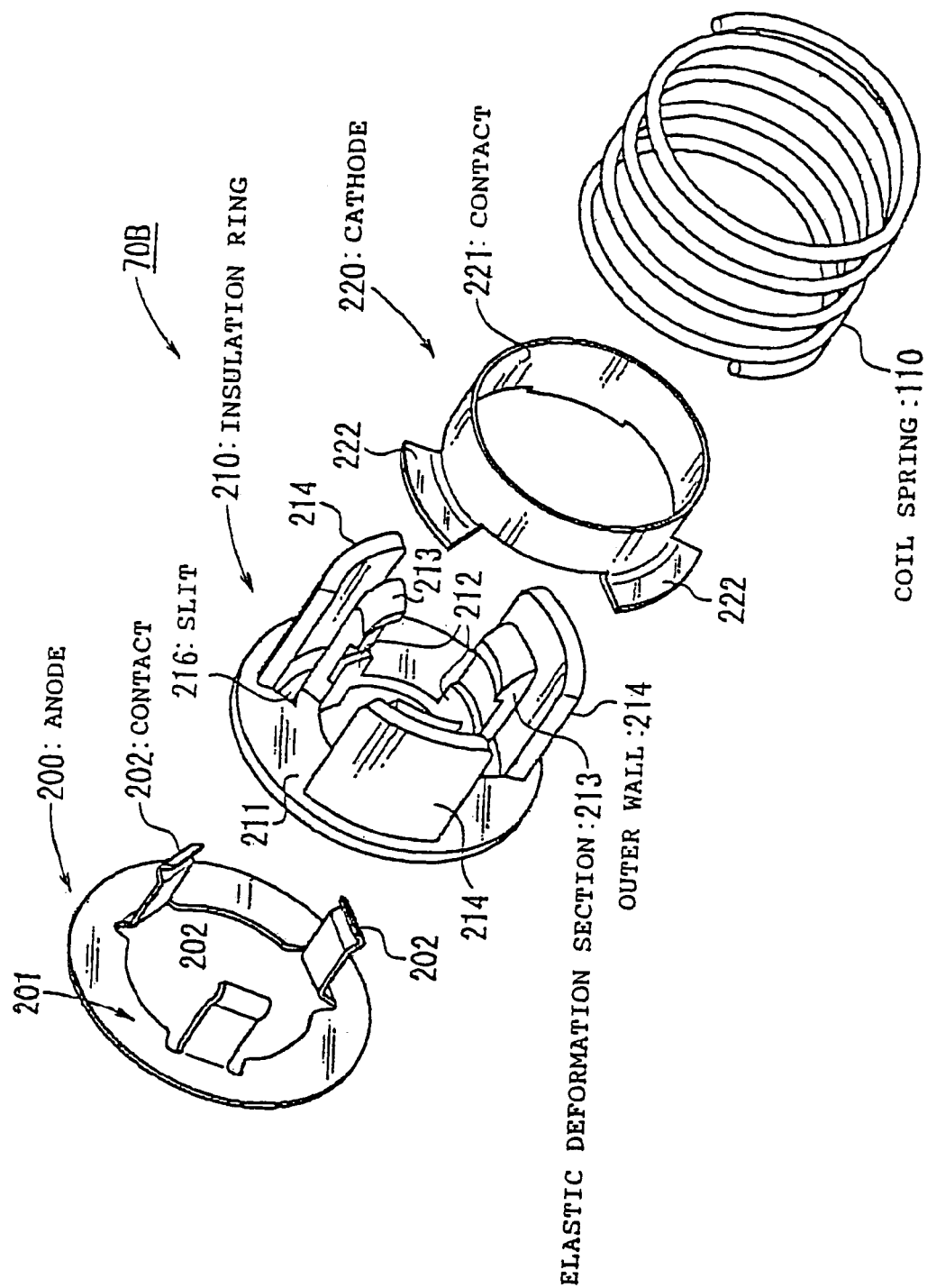
FIG. 10 is an exploded perspective view of the horn switch gear of FIGS. 9A and 9B.
Figure 11:
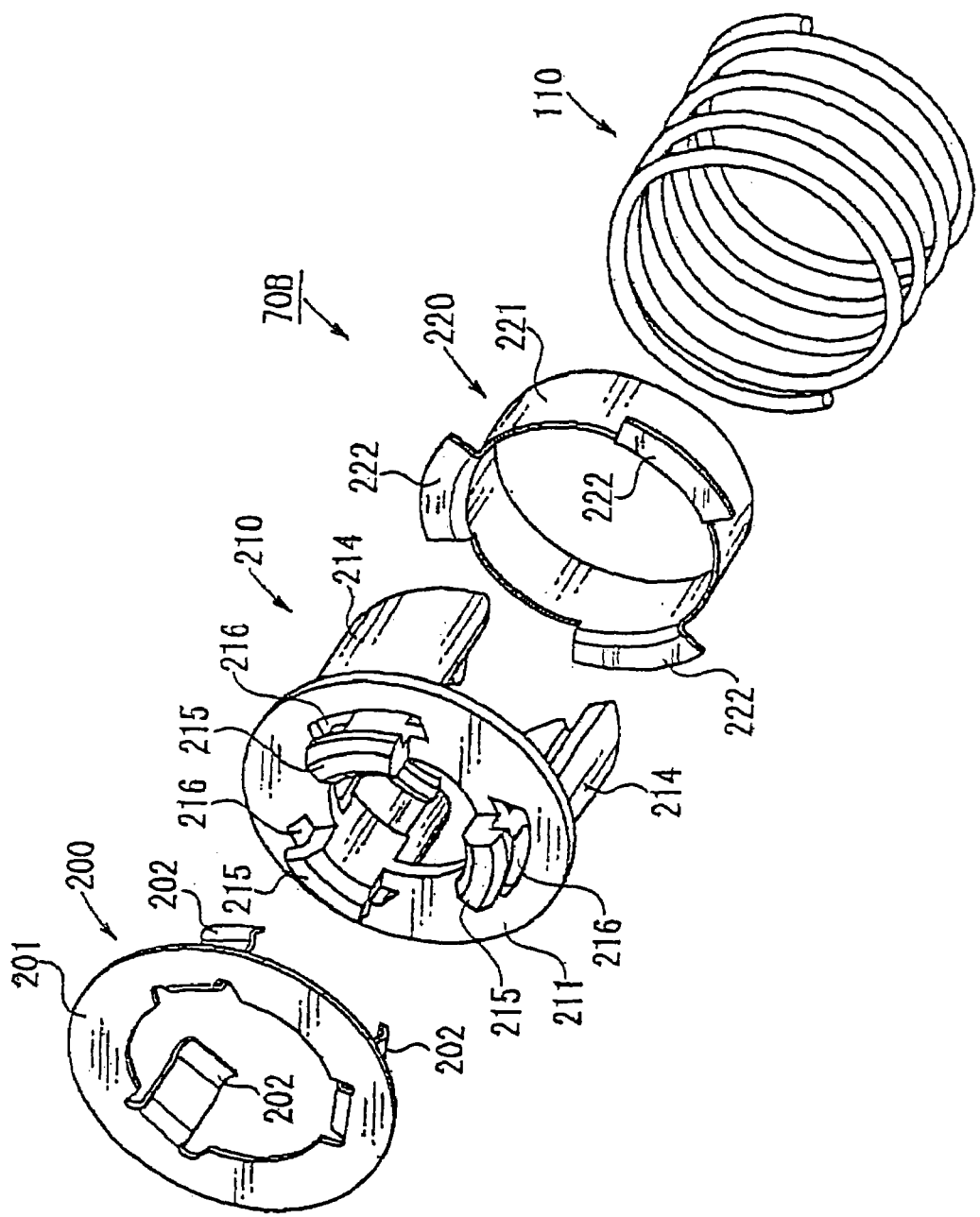
FIG. 11 is an exploded perspective view of the horn switch gear of FIGS. 9A and 9B.

Referring to FIGS. 9 to 11, a horn switch gear 70B according to a third embodiment will be described.

This embodiment includes a truncated-cone shaped tapered section 16A on the upper surface of the extension 16 of the retainer 10, the guide shaft 50 being arranged coaxially with the tapered section 16A.

In this embodiment, an anode 200 includes a flange 201 and three contacts 202 rising from the inner periphery of the flange 201.

An insulation ring 210 includes a flange 211, inner walls 212 and outer walls 214 rising from the inner and the outer peripheries of the flange 211, respectively, elastic deformation sections 213 extending from the ends of the inner walls 212 in parallel with the outer walls 214, pawls 215 projecting from the flange 211 in the opposite direction to the inner walls 212, and slits 216 provided in the flange 211 between the inner walls 212 and the outer walls 214.

A cathode 220 includes a cylindrical contact 221 and collars 222 projecting outward from one end of the contact 221.

As shown in FIGS. 9A and 9B, the contacts 202 and 221 are inserted between the inner walls 212 and the outer walls 214 of the insulation ring 210. The contacts 202 of the anode 200 pass through the slits 216 and overlap with the outer surfaces of the inner walls 212 and the elastic deformation sections 213, while the contact 221 of the cathode 220 overlaps with the inner surfaces of the outer walls 214.

The cathode collars 222 overlap with the flange 211 of the insulation ring 210, with which the upper end of the coil spring 110 is brought into contact. The lower end of the coil spring 110 is brought into contact with the upper surface of the extension 16. Thus, the cathode 220 comes into conduction with the vehicle body through the coil spring 110.

As shown in a restored position shown in FIG. 9A, the elastic deformation sections 213 overlap with the outer surface of the tapered section 16A or is slightly separated therefrom until the module cover 40 is pushed. When the module cover 40 is pushed into a backward position by an occupant, the elastic deformation sections 213 are pushed down along the tapered section 16A to expand like straddle legs, as shown in FIG. 9B. Thus, the contacts 202 of the anode 200 overlapping with the outer surfaces of the elastic deformation sections 213 are brought into contact with the contact 221 of the cathode 220 to blow the horn.

When the occupant releases the pressure applied to the module cover 40, the module cover 40 moves back to the restored position (FIG. 9A) by means of the coil spring 110, thereby stopping the horn.

Figures 12A, 12B:
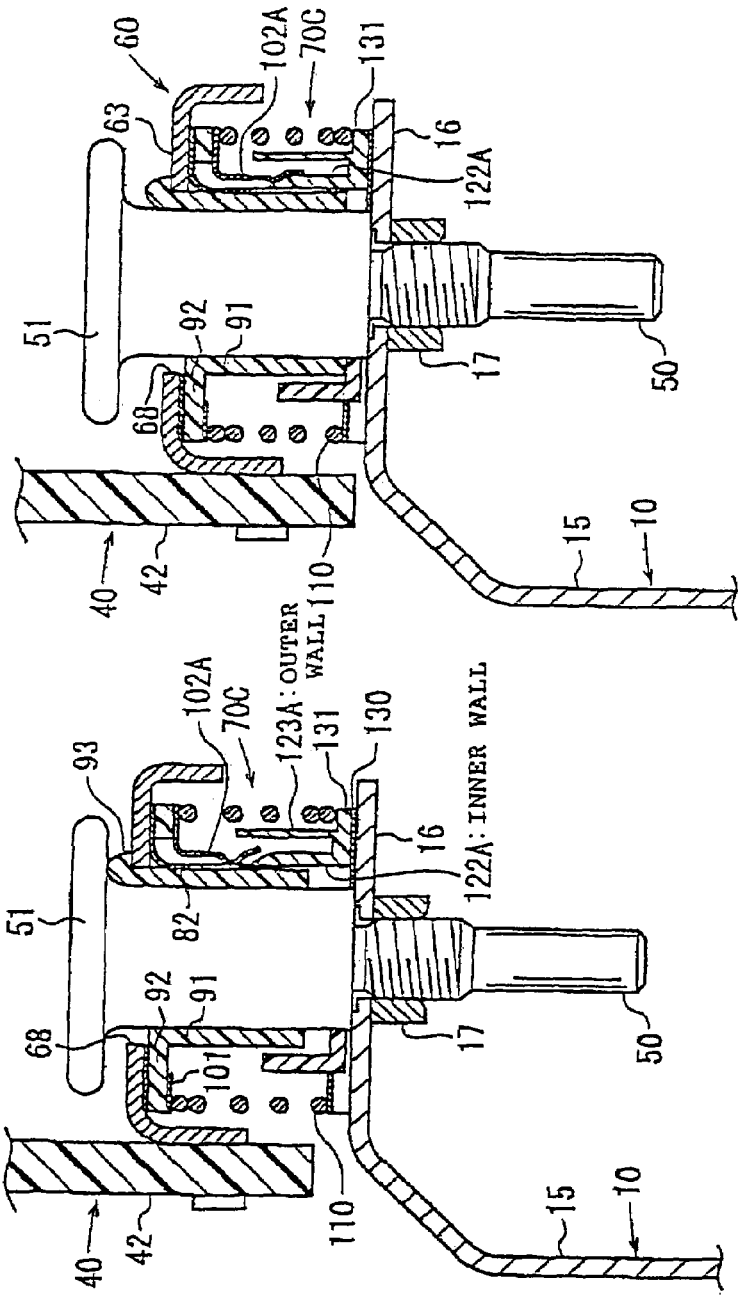
FIGS. 12A and 12B are sectional views of a fourth embodiment of a horn switch gear according to the present invention.

In the previously described embodiments, the contacts of the horn switch gear are closed to thereby blow the horn. It is also possible, however, to have a horn control circuit which supplies no power to the horn while the contacts are closed but which, upon opening the contacts, supplies power to the horn. FIGS. 12A and 12B show an example of such the horn switch gear. The horn switch gear 70C is constructed such that, in the horn switch gear 70 shown in FIGS. 1 to 5, contacts 102A and contacts 82 are in contact with each other (FIG. 12A) until the module cover 40 is pushed into a backward position by an occupant (FIG. 12B). When the module cover 40 is pushed, the inner walls 122A of the insulation ring enter the contacts 82 and 102A and separate them from each other. Reference numeral 123A indicates an insulation-ring outer wall. The other arrangement of FIGS. 12A and 12B is the same as that of FIG. 2. Similarly, the embodiments of FIGS. 6 to 11 may also be constructed to blow the horn by opening the contacts.

The above embodiments are merely examples of the present invention. The invention may employ other arrangements different from those in the drawings. For example, in the above embodiments, the contacts may not be fixed to the module cover 40 but rather to the extension 16 such as, for example, as shown in the embodiment shown in FIGS. 13A and 13B.

Figure 13B:
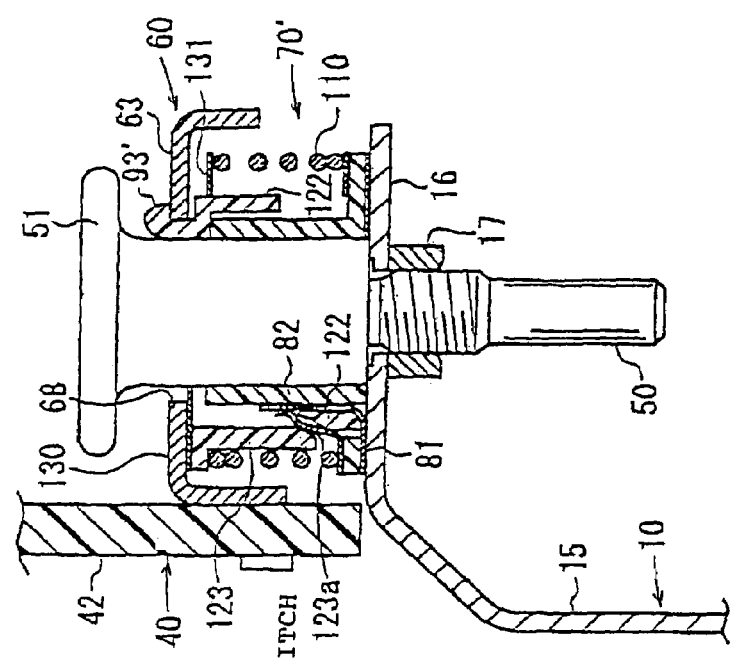
FIGS. 13A and 13B are sectional views of a fifth embodiment of a horn switch gear according to the present invention.
Figure 13A:
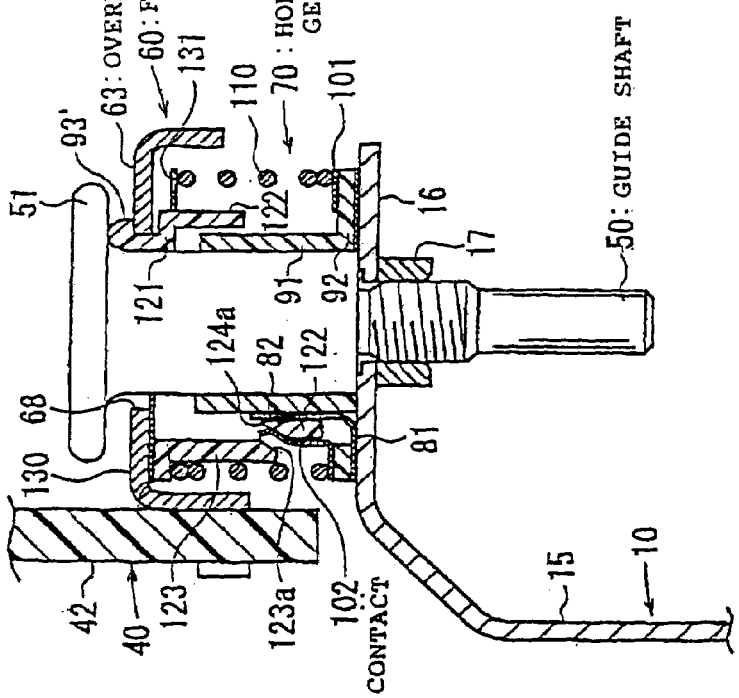

FIGS. 13A and 13B show an embodiment of a horn switch gear 70' in which the horn switch gear 70 of FIG. 2 is essentially flipped vertically. In this embodiment, however, the pawls 93' rise from the inner periphery of the flange 121 of the insulation ring. The remain portions of the horn switch gear 70' are the same as that of the horn switch gear 70, wherein the same numerals indicate the same components.

As shown in FIG. 13A, while the module cover 40 is not pushed (i.e., the module 40 is in a restored position), the contacts 82 and 102 are separated from each other, whereas when the module cover 40 is pushed into a backward position (FIG. 13B) by an occupant, the contacts 82 and 102 are brought into contact with each other, thereby blowing the horn in a manner substantially similar to the horn switch gear 70 shown in FIG. 2.

Figure 14:
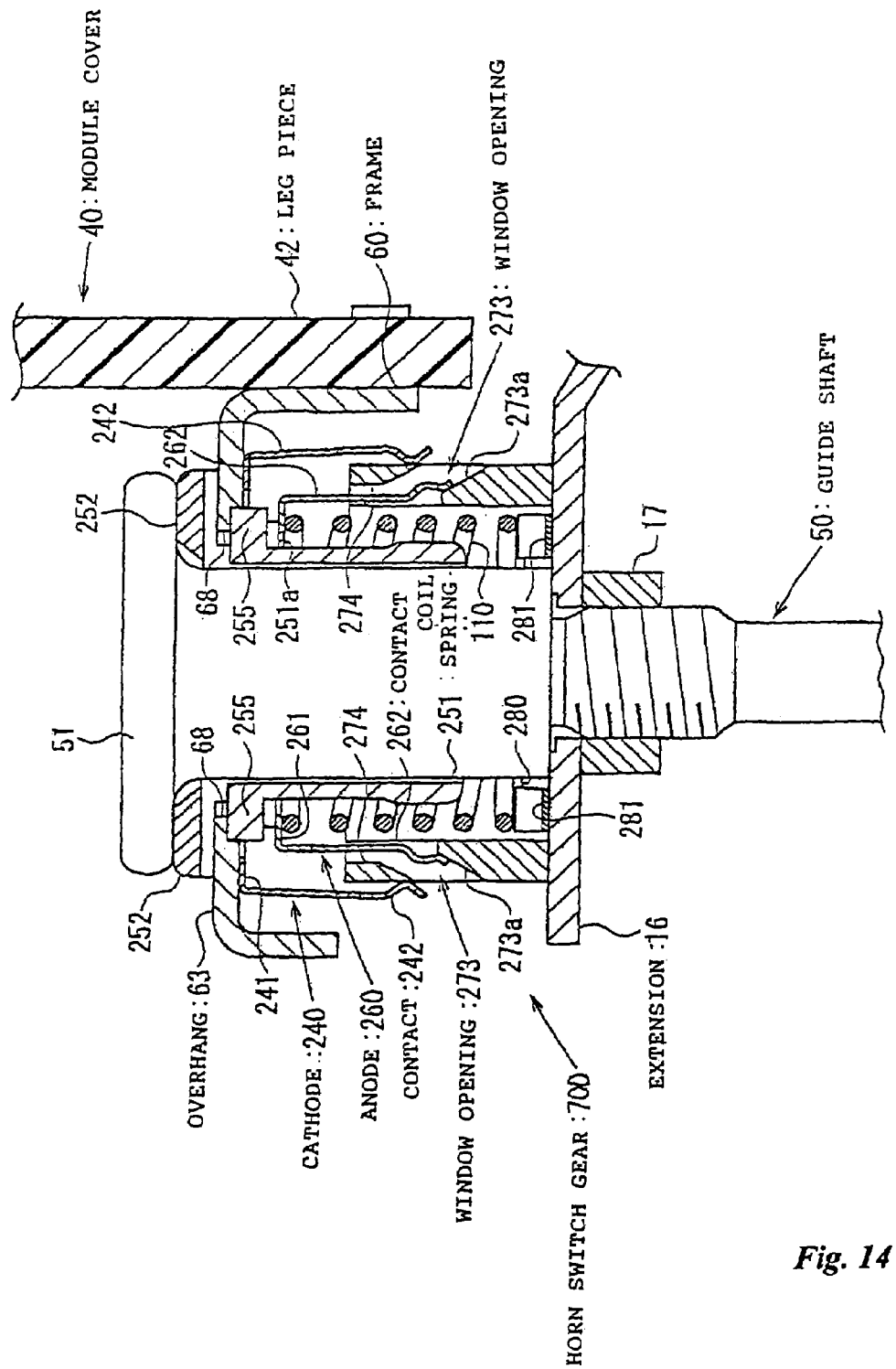
FIG. 14 is a sectional view of a sixth embodiment of a horn switch gear according to the present invention.
Figure 15:
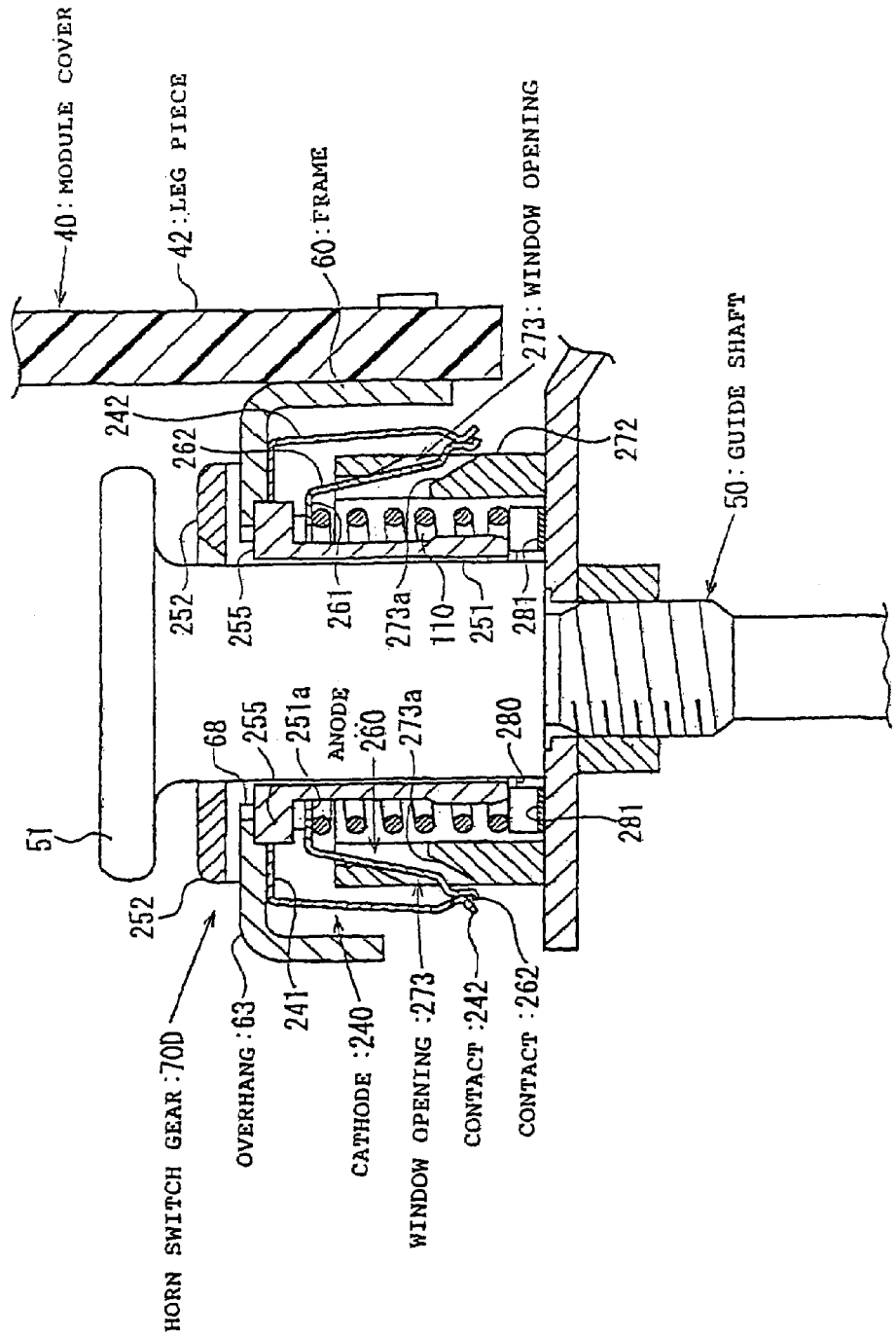
FIG. 15 is a sectional view of the horn switch gear of FIG. 14.

FIG. 14 is a sectional view of a horn switch gear 70D according to another embodiment with a module cover in an unpushed condition (i.e., in a restored position). FIG. 15 is a sectional view of the horn switch gear 70D with the module cover in a pushed condition (i.e., in a backward position). And, FIG. 16 is an exploded perspective view of the horn switch gear 70D.

Figure 16:
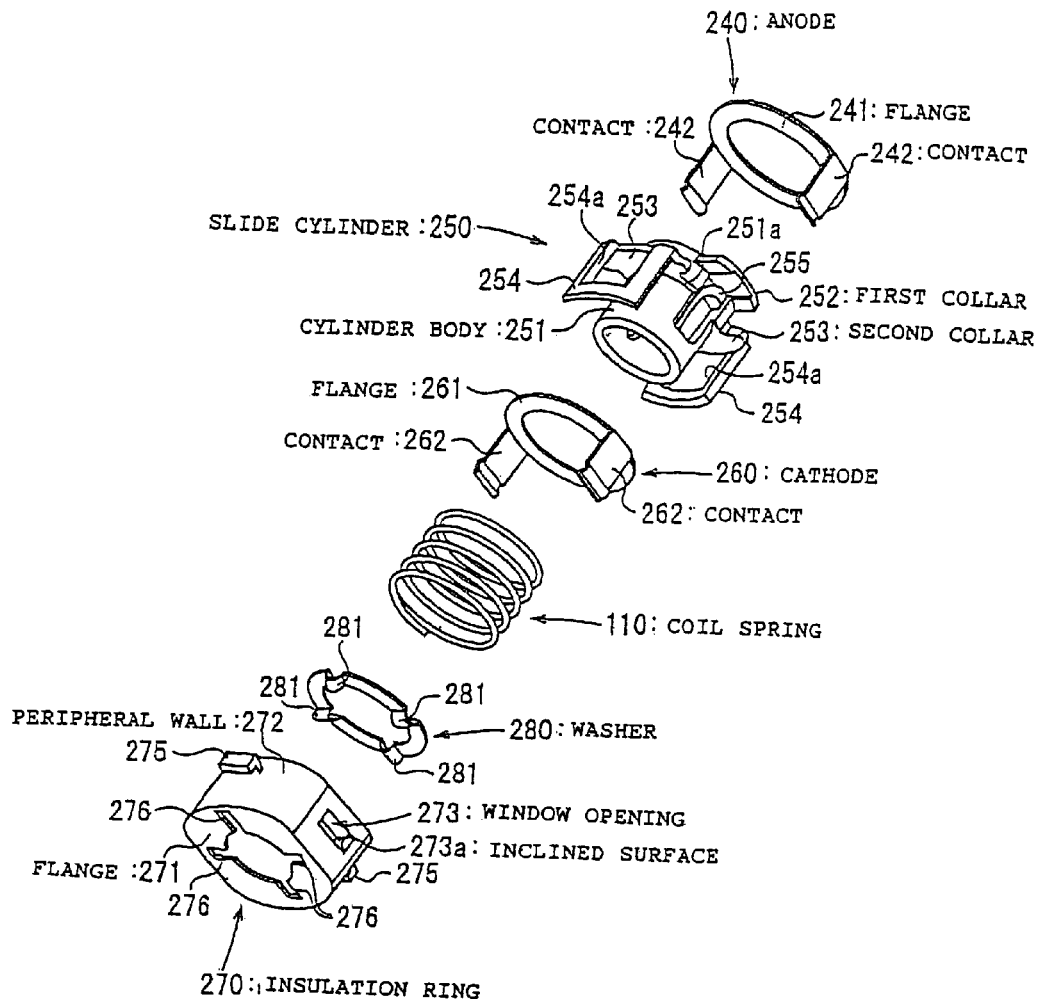
FIG. 16 is an exploded perspective view of the horn switch gear of FIG. 14.

Referring to FIG. 16, the horn switch gear 70D includes an anode 240, a slide cylinder 250, a cathode 260, the coil spring 110, an insulation ring 270, and a washer 280.

The anode 240 includes a washer-shaped ring flange 241 and two tongue-shaped contacts 242 rising from the outer periphery of the flange 241 in the same direction and around the axial center of the flange 241 at regular intervals.

The slide cylinder 250 includes a tubular cylinder body 251, two first collars 252 extending radially from one end of the cylinder body 251 along the axial center, two second collars 253 which extending radially outward from the outer circumference of the cylinder body 251 at even intervals from one end of the first collars 252 toward the other end of the first collars 252 along the axial center (hereinafter, the other end is lower and the one end is upper), outer walls 254 rising downward along the outer circumference of the cylinder body 251 from the distal ends of the extensions of the second collars 253, and a pair of facing pieces 255 projecting from the outer circumference of the cylinder body 251 so as to face the lower surfaces of the first collars 252.

An upper part of the cylinder body 251 (in the axial direction) is larger in diameter than a lower part of the cylinder body 251; a step 251a is formed between the upper and lower parts. The step 251a is flush with the lower surface of the second collars 253.

The first collars 252 and 252 are arranged around the axial center of the cylinder body 251 at even intervals. The second collars 253 and 253 are arranged around the axial center of the cylinder body 251 at even intervals with a phase difference of 90° from the first collars 252.

The outer walls 254 each have a guide hole 254a for a later-described guide projection 275 to be fitted. The guide hole 254a extends downward (toward the distal end) from the base end of the outer wall 254 so as to cut out the end rim of the second collar 253.

Each facing piece 255 can be elastically displaced from the lower surface of the first collar 252 substantially in the direction toward and away therefrom. The facing pieces 255 and the first collars 252 elastically clamp the periphery of the guide-shaft insertion hole 68 provided in the overhang 63 of the frame 60 that supports the upper part of the horn switch gear 70D.

The interval between the lower surface of the first collar 252 and the upper surface of the second collar 253 is substantially the same as the total thickness of the periphery of the guide-shaft insertion hole 68 and the flange 241 of the anode 240.

The slide cylinder 250 is constructed of an insulative synthetic resin or the like.

The cathode 260 includes a ring-shaped flange 261 and two tongue-shaped contacts 262 rising downward from the outer periphery of the flange 261. The contacts 262 and 262 are arranged around the axial center of the flange 261 at even intervals. The interval between the contacts 262 and 262 is larger than the outer diameter of the coil spring 110 and smaller than the interval between the contacts 242 and 242 of the anode 240.

The insulation ring 270 includes a ring-shaped flange 271 and a cylindrical peripheral wall 272 rising from the outer periphery of the flange 271. The outer diameter of the peripheral wall 272 is equal to or slightly smaller than the interval between the inner surfaces of the outer walls 254 and 254 of the slide cylinder 150 and equal to or slightly larger than the space between the contacts 242 and 242 of the anode 240.

The peripheral wall 272 has two windows (also referred to as "window openings") 273 having a size for each contact 262 of the cathode 260 to pass through. The inner circumference of the peripheral wall 272 has guide grooves 274 (FIGS. 14 and 15), from the upper rim to the windows 273, for guiding the contacts 262 into the windows 273. The lower rim of each window 273 forms an inclined surface 273a which is inclined downward and outwardly (radially) from the peripheral wall 272 such that a lower part of the inclined surface 273a is separated from the center of the peripheral wall 272, as shown in FIGS. 14 and 15. The windows 273 and 273 are arranged around the axial center of the peripheral wall 272 at even intervals.

Two guide projections 275, which project from the outer circumference of the peripheral wall 272, come into engagement with the guide holes 254a of the outer walls 254 of the slide cylinder 250. The guide projections 275 are arranged with a phase difference of 90° from the windows 273.

The flange 271 of the insulation ring 270 has four cutaway portions 276 at regular intervals around the inner periphery thereof. The washer 280 includes four projections 281 arranged at regular intervals from the lower surface to enter the cutaway portions 276. Each projection 281 has a rising height larger than the thickness of the flange 271, thus projecting downward from the lower surface of the flange 271, with the horn switch gear 70D assembled (FIGS. 14 and 15).

In assembling the horn switch gear 70D, the anode 240 is first fitted on the upper end (between the first collars 252 and the second collars 253) of the cylinder body 251 of the slide cylinder 250 to superpose the flange 241 of the anode 240 on the upper surfaces of the second collars 253. The cathode 260 is fitted on the lower ends of the cylinder body 251 to superpose the flange 261 of the cathode 260 on the lower surfaces of the second collars 253. At that time, they are arranged so that the contacts 242 of the anode 240 and the contacts 262 of the cathode 260 are positioned in the same phase around the axial center of the cylinder body 251 (briefly, the contacts 242 of the anode 240 face the outer sides of the contacts 262 of the cathode 260) and are arranged with a phase difference of 90° from the second collars 253. The anode 240 and the cathode 260 are fixed to the second collars 253 with an adhesive or the like as necessary.

The upper end of the cylinder body 251 is inserted into the guide-shaft insertion hole 68 of the overhang 63. The first collars 252 are arranged on the upper surface of the overhang 63, while the second collars 253 are arranged on the lower surface of the overhang 63. At that time, the periphery of the guide-shaft insertion hole 68 is clamped by the facing pieces 255 and the first collars 252. Thus, the slide cylinder 250 is fixed to the overhang 63. The flange 241 of the anode 240 is clamped between the overhang 63 and the second collars 253, through which the contacts 242 are brought into conduction with the overhang 63.

The coil spring 110 is then fitted on the lower end of the cylinder body 251 of the slide cylinder 250. The respective contacts 242 and 262 of the anode 240 and the cathode 260 are arranged outside the coil spring 110.

The washer 280 is next superposed on the upper surface of the flange 271 of the insulation ring 270. At that time, the projections 281 of the washer 280 are fitted in the cutaway portions 276 of the flange 271. The peripheral wall 272 of the insulation ring 270 is fitted on the lower end of the coil spring 110. At that time, the upper end of the coil spring 110 is brought into contact with the flange 261 of the cathode 260, while the lower end is brought into contact with the washer 280. The peripheral wall 272 is then inserted between the outer walls 254 and 254 of the slide cylinder 250 while the coil spring 110 is contracted by pressure to bring the guide projections 275 into engagement with the respective guide holes 254a of the outer walls 254. At that time, the contacts 262 of the cathode 260 are arranged in the guide grooves 274 to the windows 273 of the inner circumference of the peripheral wall 272, while the contacts 242 of the anode 240 are arranged along the outer circumference of the peripheral wall 272.

Thereafter, the guide shaft 50 is inserted into the cylinder body 251 of the slide cylinder 250 and the end of the guide shaft 50 is screwed into the nut 17 of the extension 16. Thus, the projections 281 of the washer 280 which project lower than the flange 271 of the insulation ring 270 through the cutaway portions 276 are brought into contact with the extension 16, so that the contacts 262 of the cathode 260 are brought into conduction with the extension 16 through the washer 280, the coil spring 110, and the flange 261. The flange 51 of the guide shaft 50 and the overhang 63 are insulated from each other by the first collars 252 of the slide cylinder 250 which are arranged on the upper surface of the overhang 63.

As shown in FIG. 14, when a horn switch gear 70D with such a structure is in a restored position, the upper parts of the windows 273 of the peripheral wall 272 interpose between the contacts 242 and 262 to separate the contacts 242 and 262 from each other, until the module cover 40 is pushed. Thus, the upper parts of the windows 273 of the peripheral wall 272 serve as interpositions which separate the contacts 242 and 262 from each other.

As shown in FIG. 15, when the module cover 40 is pushed into a backward position by an occupant, the frame 60 integrated with the module cover 40 moves back downwardly to move the slide cylinder 250, the anode 240, and the cathode 260 downward while contracting the coil spring 110 by pressure. Thus, the contacts 242 and 262 also move downward integrally therewith, so that the contacts 262 are pushed outward by the inclined surfaces 273*a* at the lower rims of the windows 273. As a result, the contacts 242 and 262 are brought into contact with each other, thereby blowing the horn.

When the pressured applied by the occupant on the module cover 40 is released, the module cover 40 moves back into the restored position (FIG. 14) by the repulsive force of the coil spring 110, thereby stopping the horn.

The above embodiments are constructed so that only the module cover 40 moves backward when pushed. It is also possible, however, to construct the module cover and the retainer such that they move backward integrally. Thus, the entire airbag system may be pushed backward to close (or open) the contacts of the horn switch gear, thereby blowing (or stopping) the horn.

The priority applications, Japanese Application 2003-187870 (filed Jun. 30, 2003) and Japanese Application 2004-002217 (filed Jan. 7, 2004) are incorporated herein by reference in their entireties.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A horn switch comprising:
    a backward moving body configured to move backward by pressure applied by an occupant, wherein the backward moving body comprises an airbag system or a module cover of an airbag system;
    a stationary body facing the backward moving body;
    a biasing member interposed between the backward moving body and the stationary body for biasing the backward moving body in a restoring direction; and
    at least one pair of contact members that are configured to be brought into or out of contact from each other by a forward or backward movement of the backward moving body,
    wherein the contact members are retained by the stationary body, and
    wherein the backward moving body comprises an interposition which is interposed between the contact members for separating the contact members from each other while the backward moving body is in a restored position, and moves away from between the contact members to bring the contact members into contact with each other while the backward moving body is in a backward position.

2. The horn switch according to claim 1, wherein the backward moving body comprises a guide configured to contact and guide at least one of the contact members to bring the contact members into contact with each other when the backward moving body is moved backward from the restored position.

3. The horn switch according to claim 1, wherein the stationary body comprises a guide for guiding at least one of the contact members to bring the contact members into contact with each other when the backward moving body is moved backward from the restored position.

4. An airbag system comprising:
    a backward moving body configured to move backward by pressure applied by an occupant;
    a stationary body facing the backward moving body;
    a horn switch comprising:
        a biasing member interposed between the backward moving body and the stationary body for biasing the backward moving body in a restoring direction; and
        at least one pair of contact members that are configured to be brought into or out of contact from each other by a forward or backward movement of the backward moving body,
    wherein the contact members are retained by the stationary body, and
    wherein the backward moving body comprises an interposition which is interposed between the contact members for separating the contact members from each other while the backward moving body is in a restored position, and moves away from between the contact members to bring the contact members into contact with each other while the backward moving body is in a backward position.

5. The airbag system according to claim 4, wherein the backward moving body comprises a guide configured to contact and guide at least one of the contact members to bring the contact members into contact with each other when the backward moving body is moved backward from the restored position.

6. The airbag system according to claim 4, wherein the stationary body comprises a guide for guiding at least one of the contact members to bring the contact members into contact with each other when the backward moving body is moved backward from the restored position.

7. A horn switch comprising:
    a backward moving body configured to move backward by pressure applied by an occupant, wherein the backward moving body includes an airbag retainer;
    a stationary body facing the backward moving body;
    a biasing member interposed between the backward moving body and the stationary body for biasing the backward moving body in a restoring direction; and
    at least one pair of contact members that are configured to be brought into or out of contact with each other by a forward or backward movement of the backward moving body,
    wherein the contact members are moved forward or backward together with the backward moving body, and
    wherein the stationary body comprises an interposition which is interposed between the contact members for separating the contact members from each other while the backward moving body is in a restored position, and is configured to bring the contact members into contact with each other while the backward moving body is in a backward position.

8. The horn switch according to claim 7, wherein the backward moving body comprises a guide configured to contact and guide at least one of the contact members to bring the contact members into contact with each other when the backward moving body is moved backward from the restored position.

9. The horn switch according to claim 7, wherein the stationary body comprises a guide for guiding at least one of the contact members to bring the contact members into contact with each other when the backward moving body is moved backward from the restored position.

10. A driver side airbag system comprising:
an airbag module including a gas generator, an airbag and an airbag retainer configured to move backward in response to a force applied by an occupant;
a horn switch positioned between the airbag module and a stationary body comprising:
   a biasing member interposed between the airbag module and the stationary body for biasing the airbag module in a restoring direction; and
   at least one pair of contact members that are configured to be brought into or out of contact from each other by a forward or backward movement of the airbag module,
wherein the contact members are retained by the stationary body, and
wherein the airbag module includes an interposition which is interposed between the contact members for separating the contact members from each other while the airbag module is in a restored position, and moves away from between the contact members to bring the contact members into contact with each other while the airbag module is in a backward position.

11. The driver side airbag system according to claim 10, wherein the airbag module comprises a guide configured to contact and guide at least one of the contact members to bring the contact members into contact with each other when the airbag module is moved backward from the restored position.

12. The driver side airbag system according to claim 10, wherein the stationary body comprises a guide for guiding at least one of the contact members to bring the contact members into contact with each other when the airbag module is moved backward from the restored position.

13. The driver side airbag system according to claim 10, wherein the biasing member is connected to the airbag module.

14. The driver side airbag system according to claim 10, wherein the biasing member is connected to the stationary body.

15. An airbag system comprising:
a movable airbag module including a gas generator, an airbag and an airbag retainer;
a horn switch positioned between the airbag retainer and a fixed vehicle structure,
wherein the horn switch includes:
a biasing member interposed between the airbag retainer and the vehicle structure for biasing the airbag module in a restoring direction; and
at least one pair of contact members that are configured to be brought into or out of contact with each other by a forward or backward movement of the airbag module; and
a guide for contacting and guiding at least one of the contact members to bring the contact members into contact with each other when the airbag module is moved backward from the restored position,
wherein the contact members are separated from each other while the airbag module is in a restored position and wherein the contact members are moved forward or backward together with the airbag module.

16. The airbag system according to claim 15, wherein the airbag module includes an interposition which is interposed between the contact members for separating the contact members from each other while the airbag module is in a restored position, and moves away from between the contact members to bring the contact members into contact with each other while the airbag module is in a backward position.

* * * * *